United States Patent
Schweiker et al.

(10) Patent No.: US 6,836,595 B1
(45) Date of Patent: Dec. 28, 2004

(54) OPTICAL COUPLING DEVICE

(75) Inventors: Wolfgang Schweiker, Weyarn (DE); Rainer Kossat, Aschau (DE)

(73) Assignee: Avanex Corporation, Fremont, CA (US)

( * ) Notice: Subject to any disclaimer, the term of this patent is extended or adjusted under 35 U.S.C. 154(b) by 225 days.

(21) Appl. No.: 10/031,901
(22) PCT Filed: Jul. 21, 2000
(86) PCT No.: PCT/DE00/02396
§ 371 (c)(1), (2), (4) Date: May 15, 2002
(87) PCT Pub. No.: WO01/07949
PCT Pub. Date: Feb. 1, 2001

(30) Foreign Application Priority Data

Jul. 21, 1999 (DE) .......................................... 199 34 184

(51) Int. Cl.[7] .............................. G02B 6/26; G02B 6/42
(52) U.S. Cl. .............................. 385/38; 385/52; 385/19; 385/56; 385/16
(58) Field of Search .............................. 385/52, 19, 56, 385/16, 38

(56) References Cited

U.S. PATENT DOCUMENTS

| | | |
|---|---|---|
| 4,864,824 A | 9/1989 | Gabriel et al. |
| 5,361,382 A | 11/1994 | Nakamura et al. |
| 5,390,266 A | 2/1995 | Heitmann et al. |
| 5,483,611 A * | 1/1996 | Basavanhally |
| 5,727,099 A * | 3/1998 | Harman |

FOREIGN PATENT DOCUMENTS

| | | | |
|---|---|---|---|
| EP | 0 168 820 | * | 1/1986 |
| WO | WO 91/06022 | * | 5/1991 |
| WO | WO 98/13718 | * | 4/1998 |

* cited by examiner

Primary Examiner—Nimeshkumar D. Patel
Assistant Examiner—Sumati Krishnan
(74) Attorney, Agent, or Firm—Moser, Patterson & Sheridan, L.L.P.

(57) ABSTRACT

An optical coupling device for injecting light between two optical waveguide end faces, it being possible to vary the geometrical position of one optical waveguide end face with respect to the other optical waveguide end face with the aid of a variable-length element. The element bears one of the two optical waveguides, and is fixed to the other optical waveguide via holding blocks. The variable-length element or the holding device is held by a spring element, which is supported directly or indirectly on at least one of the holding blocks and permits movement of the variable-length element or the holding element in the longitudinal direction of the variable-length element in which the variable-length element extends or shortens, and suppresses movement of the variable-length element perpendicular to the longitudinal direction of the variable-length element, the fiber being held on the other optical waveguide by the spring element close to the fixing of the holding blocks.

20 Claims, 3 Drawing Sheets

OPTICAL COUPLING DEVICE

PRIORITY APPLICATIONS

This application claims the benefit of priority under 35 U.S.C. §119 of German patent Application No. P19924183.2, filed Jul. 21, 1999, and is a national stage filing under 35 U.S.C. §371 of PCT application PCT/DE00/02396, filed Jul. 21, 2000.

FIELD OF THE INVENTION

The invention relates to an optical coupling device for injecting light between two optical waveguide end faces, it being possible to vary the geometrical position of the one optical waveguide end face, for example an optical fibre, with respect to the other optical waveguide end face, for example an optical waveguide chip, with the aid of a variable-length element which, via a holding device, carries one of the two optical waveguides and is fixed to the other optical waveguide by two holding blocks.

BACKGROUND OF THE INVENTION

An optical coupling device is known, for example, from WO 98/13718. Such coupling devices are used in optical filters according to the phased-array principle with an injection face which light enters at a specific geometrical position, the geometrical position influencing the output wavelength of the optical filter. Such optical filters according to the phased-array principle are used, in particular, as multiplexers or demultiplexers in optical wavelength-multiplex operation (WDM), since they exhibit low insertion attenuation and high crosstalk suppression. The optical filter has, as an essential component, a plurality of curved optical waveguides of different length, which form a phase-shifter region.

German Patent Application DE 44 22 651.9 describes that the central wavelength of a phased-array filter can be established through the position of an injection optical waveguide, which guides the light into the optical waveguide. In this way, the central wavelength of the optical filter can be adjusted accurately through the geometrical positioning of the injection optical waveguide or the injection fibre. Since it is therefore desirable for the optical waveguides to be shifted relative to one another, the optical waveguides cannot be adhesively bonded directly to one another.

In the optical coupling device cited in the Field Of The Invention, the holding blocks are fixed to the chip, and the optical waveguide fibres are held on the variable-length element. In this case, the variable-length element may oscillate or bend, which causes temporary or permanent deadjustment of the fibre, even though a certain degree of guidance is provided.

SUMMARY OF THE INVENTION

The invention is, therefore, directed to ensuring improved guidance of the variable-length element parallel to its main extension direction (longitudinal axis of the element) and to avoid deadjustment during operation.

In the optical coupling device of the invention, the variable-length element or the holding element is held by a spring element, which is supported directly or indirectly on at least one of the holding blocks and permits movements of the variable-length element or the holding element in the longitudinal direction of the variable-length element in which the variable-length element extends or shortens, and suppresses movement of the variable-length element perpendicular to the longitudinal direction of the variable-length element, the spring element being held close to the fixing of the holding blocks on the other optical waveguide. In the invention, one optical waveguide, that is to say the optical fibre, is held as close to the fixing as possible by the spring element. The variable-length element, which is necessarily fixed, further removed, to the other (second) optical waveguide, that is to say to the chip, presses against the holding element for the fibre, in order to permit the relative movement of the fibre with respect to the chip. The spring element is configured in such a way that a residual movement perpendicular to the plane is suppressed as completely as possible. This means that the movement of the fibre relative to the chip takes place very exactly parallel to the chip face, and deadjustment perpendicular to the latter virtually does not occur.

In the invention, it is further advantageous that the holding block can be adhesively bonded to the second optical waveguide (optical waveguide chip, also called a planar waveguide) very close to the fibre, which avoids long levers. As a result, undesired movements in the directions perpendicular to the desired extension of the variable-length element are reduced considerably.

One advantageous configuration of the coupling device according to the invention is that the variable-length element, the holding element and the spring element are arranged between the two holding blocks, and in that the holding element is formed in one piece with the variable-length element, and the spring element is formed separately therefrom. In this case, it is advantageous that the material of the spring element can be selected without having to take into account the requirements which are placed on the material of the variable-length element.

A further advantageous configuration of the coupling device according to the invention is that the variable-length element, the holding element and the spring element are arranged between the two holding blocks, and in that the holding element, the variable-length element and the spring element are formed in one piece. This configuration has production advantages and also has advantages in relation to the operational reliability and the lifetime of the arrangement.

A further advantageous configuration of the coupling device according to the invention is that the variable-length element, the holding element and the spring element are arranged between the two holding blocks, and in that the holding element and the spring element are formed in one piece and the variable-length element is formed separately therefrom. Here, too, the holding elements and the spring element can be produced without any regard to the material of the variable-length element.

A further advantageous configuration of the coupling device according to the invention is that the spring element is formed by slots in the variable-length element or the holding element, the said slots lying in a plane parallel to the end faces and perpendicular to the longitudinal direction of the variable-length element. These slots can be applied particularly advantageously when the variable-length element, the holding element and the spring element or, alternatively, at least the holding element and the spring element, are formed in one piece with one another. In addition, the direction of the slots is advantageous in as much as if the slots are rotated, for example through 90°, the stability in the critical direction perpendicular to the plane of the chip is no longer adequately guaranteed.

A further advantageous configuration of the coupling device according to the invention is that an even number of slots is provided. As a result, the tendency to tilt can be minimized.

A further advantageous configuration of the device according to the invention is that the spring element is formed by holes in the variable-length element or the holding element, the said holes lying in a plane parallel to the end faces and perpendicular to the longitudinal direction of the variable-length element. Holes of this type can easily be produced by machine, the spring constant of the spring element being adjustable via the size of the holes.

A further advantageous configuration of the coupling device according to the invention is that the spring element consists of bent spring sheet, whose spring sections lie in planes which are perpendicular to a plane which is perpendicular to the chip face and perpendicular to the longitudinal direction of the variable-length element. This orientation of the spring sections is advantageous with regard to suppressing the oscillatory movements perpendicular to the longitudinal direction of the variable-length element.

A further advantageous configuration of the coupling device according to the invention is characterized in that the length of the variable-length element is selected such that the spring element is under pre-stress in the initial position of the variable-length element. This ensures that the holding device, if it is formed separately from the variable-length element, follows the variable-length element when the latter contracts.

A further advantageous configuration of the device according to the invention is that the two holding blocks are connected to each other by a clip, the arrangement, comprising the two holding blocks, the variable-length element, the holding element and the spring element, being imparted greater stability.

A further advantageous configuration of the coupling device according to the invention is that the two holding blocks are connected to each other by a frame, a clip being provided at the top and bottom in each case between the two holding blocks, and the clips being produced from one piece with the holding blocks, so that they can be adhesively bonded to the chip together with the said holding blocks.

A further advantageous configuration of the coupling device according to the invention is that the spring element is located between the clip and the frame and the holding element which is located between the two holding blocks, and in that the variable-length element is mounted in one of the holding blocks and is connected to the holding element device. In this case, the bonding or fixing points of the entire arrangement, namely the adhesive bonding of the holding blocks to the chip, are located in the immediate vicinity of the injection point, and the relative movement between the two optical waveguides is carried out by means of the variable-length element, which is mounted in one of the holding blocks and presses against the holding element.

A further advantageous configuration of the coupling device according to the invention is that an opposing spring is provided between the holding element and the other holding block and, in the initial position of the variable element, is under pre-stress, by which means, in the event of contraction of the variable-length element, the corresponding return movement is increased.

A further advantageous configuration of the coupling device according to the invention is that the variable-length element is guided in one of the holding blocks and is operatively connected to a wavelength compensating screw, with which the position of the variable-length element can be adjusted in the longitudinal direction of the latter, as a result of which the zero position of the wavelength can advantageously still be adjusted, even after the coupling device has been bonded adhesively to the optical waveguide chip, which further increases the production reliability.

Finally, a further advantageous configuration of the coupling device according to the invention is that the holding element has a ferrule, in which the optical waveguide or the optical fibre is fixed. Although it would also be possible to fix the fibre to the spring element without a ferrule, for example by means of adhesive bonding in a V groove, the use of a ferrule is preferred because of the accuracy of the installation and the avoidance of ageing phenomena on the adhesive for the adhesive bonding of the fibre in the V groove.

BRIEF DESCRIPTION OF THE DRAWINGS

Exemplary embodiments of the invention will be described by using the appended drawings, in which.

DETAILED DESCRIPTION OF THE INVENTION

Figure 1:
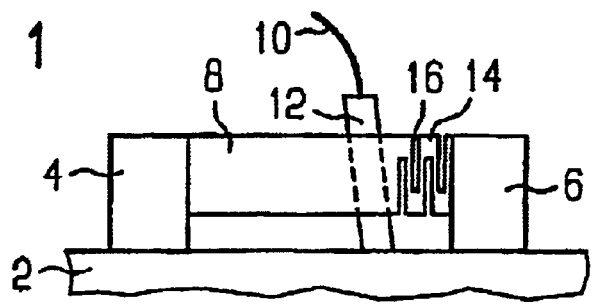
FIG. 1 shows a side view of a coupling device according to a first exemplary embodiment of the invention.

FIG. 1 shows a side view of a coupling device according to a first exemplary embodiment of the invention, in which two holding blocks 4, 6 (for example glass or glass ceramic) are fixed or adhesively bonded on an optical waveguide chip 2. One of the holding blocks 4 bears the variable-length element 8, which is produced from aluminium, for example, and on which a fibre 10 with a ferrule 12 is fixed. The variable-length element 8 is supported on the other holding block 6 via a spring element 14, which is formed by slots 16.

The spring element 14 is formed by slots 16 which are formed in the variable-length element 8 and which extend in a plane perpendicular to the longitudinal direction of the variable-length element 8, the open edges in this case being perpendicular to the plane of the chip. An even number of slots 16, namely four slots, is provided. In this exemplary embodiment, the variable-length element 8 is formed in one piece with the spring element 14, and an end section of the variable-length element 8 forms the holding element for the ferrule 12.

Figure 2:
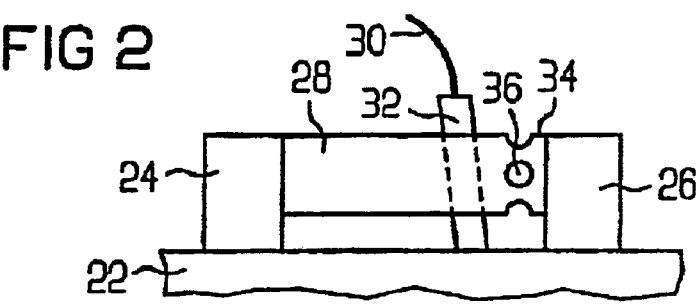
FIG. 2 shows a side view of a second exemplary embodiment of the coupling device according to the invention.

FIG. 2 shows a side view of a coupling device according to a second exemplary embodiment of the invention, in which two holding blocks 24, 26 are fixed or adhesively bonded on an optical waveguide chip 22. One of the holding blocks 24 bears the variable-length element 28, on which a fibre 30 with a ferrule 32 is fixed. The variable-length element 28 is supported on the other holding block 26 via a spring element 34, which is formed by holes 36.

As in the preceding exemplary embodiment, the hole 36 is also located in a plane parallel to the end faces of the optical waveguides and perpendicular to the longitudinal direction of the variable-length element. The variable-length element 28 and the spring element 34 are formed in one piece, and the ferrule 32 is anchored directly in the variable-length element, its corresponding section serving as a holding element.

Figure 3:
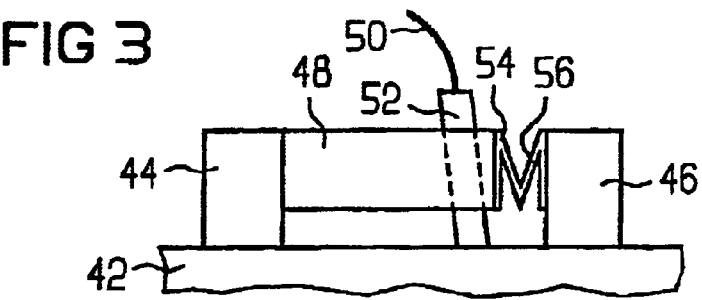
FIG. 3 shows a side view of a third exemplary embodiment of the coupling device according to the invention.

FIG. 3 shows a side view of a coupling device according to a third exemplary embodiment of the invention, in which two holding blocks 44, 46 are fixed or adhesively bonded on an optical waveguide chip 42. One of the holding blocks 44 bears the variable-length element 48, on which a fibre 50 with a ferrule 52 is fixed. The variable-length element 48 is supported on the other holding block 46 via a spring element 54 which consists of spring sheet and is formed by spring sections 56.

The spring sections 56 of the spring element 54 lie in planes which are perpendicular to the chip face and perpendicular to the longitudinal direction of the variable-length element 48. In this exemplary embodiment, the spring element 54 is formed separately from the variable-length element 48.

Figure 4:
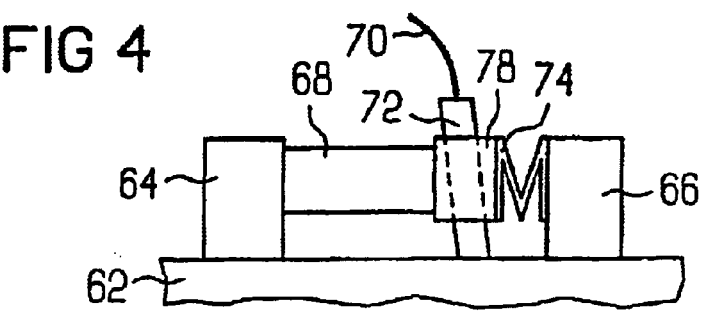
FIG. 4 shows a side view of a fourth exemplary embodiment of the coupling device according to the invention.

FIG. 4 shows a side view of a coupling device according to a fourth exemplary embodiment of the invention, in which two holding blocks 64, 66 are fixed or adhesively bonded on an optical waveguide chip 62. One of the holding blocks 64 bears the variable-length element 68 which is supported on the other holding block 66 via the holding device 78 and a spring element 74. The holding device 78, in which a fibre 70 with a ferrule 72 is fixed, is connected to the spring element 74. In this exemplary embodiment, the three components, namely the variable-length element 68, the holding element 78 and the spring element 74, are each formed as individual components.

Figure 5:
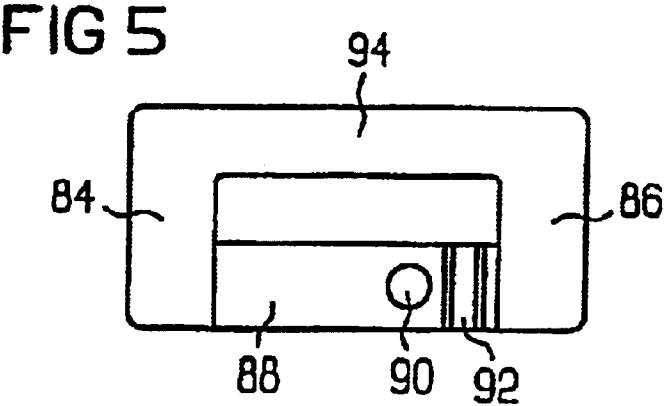
FIG. 5 shows a plan view of a fifth exemplary embodiment of the coupling device according to the invention.
Figure 6:
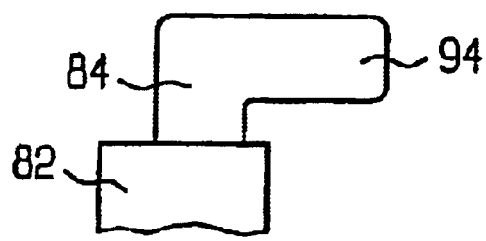
FIG. 6 shows a plan view of the end of the fifth exemplary embodiment of the coupling device according to the invention.

FIG. 5 shows a plan view of a fifth exemplary embodiment of the coupling device according to the invention, in which two holding blocks 84, 86 are provided, of which one holding block 84 bears a variable-length element 88 which has a hole 90 for a ferrule as a holder for an optical fibre and is supported via a spring element 92 on the other holding block 86. The two holding blocks 84, 86 are connected to each other via a clip 94, as shown in plan view in FIG. 5 and in side view in FIG. 6. The coupling device is coupled to an optical waveguide chip 82, as illustrated in FIG. 6.

Figure 7:
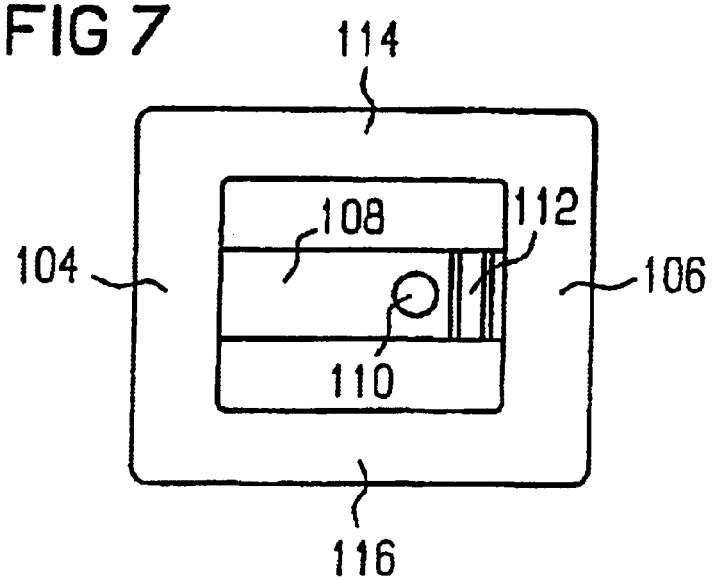
FIG. 7 shows a plan view of a sixth exemplary embodiment of the coupling device according to the invention.

FIG. 7 shows a plan view of a sixth exemplary embodiment of the coupling device according to the invention, which has two holding blocks 104, 106, of which one holding block 104 bears a variable-length element 108 which has a hole 110 for a ferrule with the optical fibre and is supported via a spring element 112 on the other holding block 106. The two holding blocks 104, 106 are connected to each other via two clips 114, 116, so that a frame is formed, which ensures that the coupling device is stabilized overall. The clips in this exemplary embodiment and in the preceding exemplary embodiment can be produced in one piece or can be adhesively bonded to each other.

Figure 8:
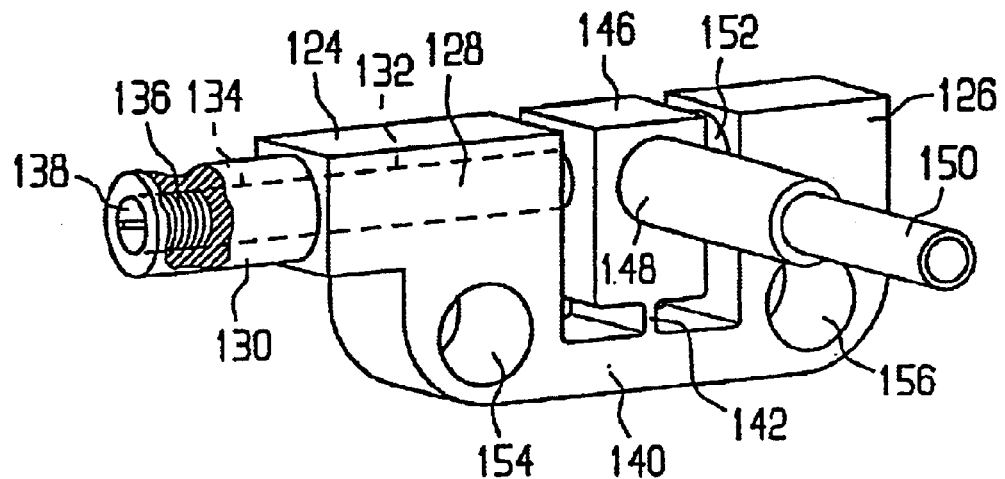
FIG. 8 shows a perspective side view of a seventh exemplary embodiment of the coupling device according to the invention.
Figure 9:
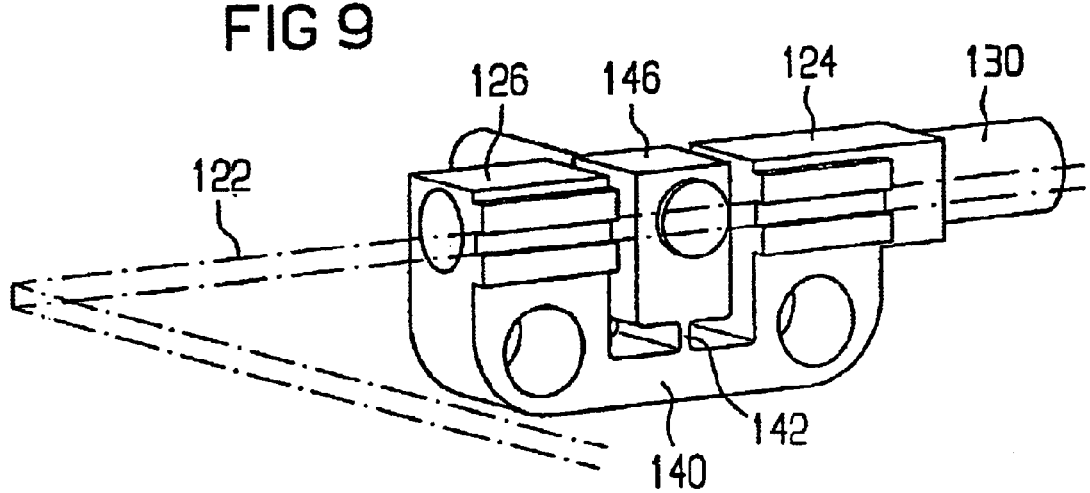
FIG. 9 shows a perspective side view of the other side of the seventh exemplary embodiment of the coupling device according to the invention.

FIG. 8 shows a perspective side view of a seventh exemplary embodiment of the coupling device according to the invention, while FIG. 9 illustrates a perspective side view of the same exemplary embodiment from the other side. In this exemplary embodiment, two holding blocks are fixed or adhesively bonded on an optical waveguide chip 122. One of the holding blocks 124 bears the variable-length element 128 in the form of a bolt, which is guided in a guide bushing 130 on the holding block 124 and in a hole 132 in the holding block 124. The guide bushing 130 and the holding block 124 are formed in one piece. A hole 134 in the bushing 130, which accommodates the outer end of the variable-length element 128, is provided with a thread 136, into which a screw 138 is screwed, using which the position of the variable-length element 128 can be varied in the longitudinal direction of the latter. The screw 138 can be provided in one piece or separately from the variable-length element 128.

The two holding blocks 124, 126 are connected to each other via a clip 140, which has a spring element 142 with a holding element [device] 146 for a ferrule 148 for holding a fibre 150. In addition, an opposing spring 152 can be arranged between the holding element [device 146 and the other holding block 126, and ensures an appropriate return movement when the variable-length element 128 shortens. The opposing spring 152 is not absolutely necessary, since the holding element [device] 146 can already be prestressed via the spring element 142. If the variable-length element 128 extends, it presses against the holding element [device] 146 and moves the fibre 150 to the right (viewing direction as in FIG. 8), the spring element 142 giving way appropriately. Finally, two holes 154, 156 are also provided in the clip 140, in order to reduce the overall weight of the coupling device.

We claim:

1. An optical coupling device for injecting light between end faces of two optical waveguides, said device comprising:
   a holding element for holding a first optical waveguide,
   a first holding block which is fitted to a second optical waveguide,
   an elongate, variable-length element which is supported on the first holding block and extends in its longitudinal direction, starting from the first holding block, parallel to the end face of the second optical waveguide and on which the holding element is provided, so that the geometrical position of the end face of the first optical waveguide can be varied with respect to the end face of the second optical waveguide,
   a second holding block fitted to the second optical waveguide and spaced from the first holding block with respect to the longitudinal direction of the variable-length element, wherein the second holding block is arranged on the side of the variable length element that is facing away from the first holding block, and
   a spring element, which is arranged between the variable-length element and the second holding block and is supported on the latter and by which the variable-length element is held and which permits movements of the variable-length element or the holding element in the longitudinal direction of the variable-length element and suppresses movement of the variable-length element perpendicular to the longitudinal direction of the variable-length element.

2. The device according to claim 1, wherein the holding element is formed in one piece with the variable-length element, and the spring element is formed separately therefrom.

3. The device according to claim 2, wherein the spring element is formed by slots in the variable-length element or the holding element, the said slots lying in a plane perpendicular to the longitudinal direction of the variable-length element, the open edges running parallel to the end faces of the optical waveguides.

4. The device according to claim 3, wherein an even number of slots is provided.

5. The device according to claim 2, wherein the spring element is formed by holes in the variable-length element or the holding element, the said holes lying in a plane parallel to the end faces of the optical waveguides and lying perpendicular to the longitudinal direction of the variable-length element.

6. The device according to claim 1, wherein the holding element, the variable-length element and the spring element are formed in one piece.

7. The device according to claim 6, wherein the spring element is formed by slots in the variable-length element or the holding element, the said slots lying in a plane perpendicular to the longitudinal direction of the variable-length element, the open edges running parallel to the end faces of the optical waveguides.

8. The device according to claim 7, wherein an even number of slots is provided.

9. The device according to claim 7, wherein the length of the variable-length element is selected such that the spring element is under pre-stress in the initial position of the variable-length element.

10. The device according to claim 6, wherein the spring element is formed by holes in the variable-length element or the holding element, the said holes lying in a plane parallel to the end faces of the optical waveguides and lying perpendicular to the longitudinal direction of the variable-length element.

11. The device according to claim 1, wherein the holding element and the spring element are formed in one piece and the variable-length element is formed separately therefrom.

12. The device according to claim 11, wherein the spring element is formed by slots in the variable-length element or the holding element, the said slots lying in a plane perpendicular to the longitudinal direction of the variable-length element, the open edges running parallel to the end faces of the optical waveguides.

13. The device according to claim 12, wherein an even number of slots is provided.

14. The device according to claim 11, wherein the spring element is formed by holes in the variable-length element or the holding element, the said holes lying in a plane parallel to the end faces of the optical waveguides and lying perpendicular to the longitudinal direction of the variable-length element.

15. The device according to claim 1, wherein the spring element consists of bent spring sheet, whose spring sections lie in planes which are perpendicular to the longitudinal direction of the variable-length element, the bent edges running parallel to the end faces of the optical waveguides.

16. The device according to claim 1, wherein the two holding blocks are connected to each other by a clip.

17. The device according to claim 1, wherein the two holding blocks are connected to each other by a frame, a clip being provided at the top and bottom in each case between the two holding blocks, and the clips being produced from one piece with the holding blocks.

18. The device according to claim 1, wherein the holding element has a ferrule, in which the optical waveguide is fixed.

19. An optical coupling device for injecting light between end faces of two optical waveguides, comprising:

first and second optical waveguides, wherein the first optical waveguide is an optical fiber and the second optical waveguide is a waveguide chip, and each of the waveguides has an end face;

first and second holding blocks affixed to the second optical waveguide in a spaced relation;

a holding element for holding the first optical waveguide;

a spring element supported in the second holding block; and an elongate variable-length element, wherein the variable-length element is supported on the first holding block and its length is paralleled to the face of the second optical waveguide, and the variable-length element ends in contact with the holding element such that it is possible to vary the geometrical position of the first optical waveguide with respect to the second optical waveguide, and wherein the spring element is positioned between the holding element attached to the variable-length element and the second holding block, and is supported on the second holding block, the spring element having the form of a body having holes selected from the group consisting of slots and bores extending perpendicular to the length direction of the variable-length element and paralleled to the end face of the second waveguide.

20. An optical coupling device for injecting light between end faces of two optical waveguides, comprising:

first and second holding blocks affixed to an optical waveguide chip in a spaced relationship;

a variable-length element disposed at least partially between the holding blocks and supported on the first holding block, wherein the variable length element is capable of extending and shortening to a fixed desired extension in a longitudinal direction parallel to an end face of the optical waveguide chip;

a holding element disposed along the variable length element, the holding element capable of holding an optical waveguide;

a spring element arranged between the variable-length element and the second holding block, wherein one end of the spring element is coupled to the second holding block and the opposite end of the spring element is coupled to the variable length element, the spring element deigned to permit movement of the variable-length element in the longitudinal direction and suppress movement of the variable-length element perpendicular to the longitudinal direction.

* * * * *